(12) United States Patent
Lee et al.

(10) Patent No.: US 12,362,348 B2
(45) Date of Patent: Jul. 15, 2025

(54) POSITIVE ELECTRODE MATERIAL FOR LITHIUM SECONDARY BATTERY, AND POSITIVE ELECTRODE AND LITHIUM SECONDARY BATTERY WHICH INCLUDE THE SAME

(71) Applicant: LG Chem, Ltd., Seoul (KR)

(72) Inventors: Woo Ram Lee, Daejeon (KR); Jun Ho Eom, Daejeon (KR); Na Ri Park, Daejeon (KR); Dong Ryoung Kang, Daejeon (KR); Jae Geun Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 548 days.

(21) Appl. No.: 17/798,958

(22) PCT Filed: Mar. 18, 2021

(86) PCT No.: PCT/KR2021/003342
§ 371 (c)(1),
(2) Date: Aug. 11, 2022

(87) PCT Pub. No.: WO2021/187907
PCT Pub. Date: Sep. 23, 2021

(65) Prior Publication Data
US 2023/0073433 A1   Mar. 9, 2023

(30) Foreign Application Priority Data
Mar. 18, 2020 (KR) .......................... 10-2020-0033435

(51) Int. Cl.
*H01M 4/505* (2010.01)
*H01M 4/36* (2006.01)
(Continued)

(52) U.S. Cl.
CPC ........... *H01M 4/364* (2013.01); *H01M 4/485* (2013.01); *H01M 4/505* (2013.01); *H01M 4/525* (2013.01);
(Continued)

(58) Field of Classification Search
CPC ..... H01M 10/052; H01M 4/505; H01M 4/525
See application file for complete search history.

(56) References Cited

U.S. PATENT DOCUMENTS

2005/0220700 A1   10/2005   Suhara et al.
2005/0271944 A1   12/2005   Suhara et al.
(Continued)

FOREIGN PATENT DOCUMENTS

CN   1701451 A      11/2005
CN   101816083 A    8/2010
(Continued)

OTHER PUBLICATIONS

International Search Report for Application No. PCT/KR2021/003342 mailed Jul. 1, 2021, 2 pages.
(Continued)

*Primary Examiner* — Kevin E Yoon
(74) *Attorney, Agent, or Firm* — Lerner David LLP (57) ABSTRACT

A positive electrode material, a positive electrode including the same, and a lithium secondary battery including the same are disclosed herein. In some embodiments, a positive electrode material includes a first positive electrode active material having a larger average particle diameter than a second positive electrode active material, wherein the first positive electrode active material and the second positive electrode active material are each independently a lithium transition metal oxide having a molar ratio of nickel of 80 mol % or more relative to the total molar amount of transition metals in the lithium transition metal oxide, and the positive electrode material satisfies Equation (1):
(Continued)

$$0 < \{(B-A)/B\} \times 100 \leq 10 \qquad \text{Equation (1):}$$

wherein, in Equation (1), A denotes a particle strength of the first positive electrode active material, and B denotes a particle strength of the second positive electrode active material.

11 Claims, 1 Drawing Sheet

(51) Int. Cl.
    *H01M 4/485*     (2010.01)
    *H01M 4/525*     (2010.01)
    *H01M 10/052*     (2010.01)
    *H01M 4/02*     (2006.01)

(52) U.S. Cl.
    CPC .... *H01M 10/052* (2013.01); *H01M 2004/021* (2013.01); *H01M 2004/028* (2013.01)

(56) References Cited

U.S. PATENT DOCUMENTS

| | | | |
|---|---|---|---|
| 2006/0057466 A1* | 3/2006 | Suhara | H01M 4/582 429/322 |
| 2007/0099087 A1 | 5/2007 | Mihara et al. | |
| 2010/0209763 A1 | 8/2010 | Okamura et al. | |
| 2018/0219212 A1 | 8/2018 | Seol et al. | |
| 2018/0241036 A1 | 8/2018 | Jo et al. | |
| 2018/0287202 A1 | 10/2018 | Matsushita et al. | |
| 2020/0266438 A1 | 8/2020 | Han et al. | |
| 2020/0388830 A1 | 12/2020 | Lee et al. | |
| 2021/0050588 A1 | 2/2021 | Oki et al. | |
| 2022/0029158 A1 | 1/2022 | Takamori | |

FOREIGN PATENT DOCUMENTS

| | | | |
|---|---|---|---|
| CN | 107949938 A | 4/2018 |
| CN | 108431998 A | 8/2018 |
| JP | 2013065468 A | 4/2013 |
| JP | 2018535520 A | 11/2018 |
| JP | 6601500 B2 | 11/2019 |
| JP | 2020-087879 A | 6/2020 |
| KR | 20050044771 A | 5/2005 |
| KR | 20060031787 A | 4/2006 |
| KR | 20070027591 A | 3/2007 |
| KR | 20120126021 A | 11/2012 |
| KR | 20170063373 A | 6/2017 |
| KR | 20170103184 A | 9/2017 |
| KR | 20180104837 A | 9/2018 |
| WO | 2005020354 A1 | 3/2005 |
| WO | 2015-045719 A1 | 4/2015 |
| WO | 2017/057078 A1 | 4/2017 |
| WO | 2017095081 A1 | 6/2017 |
| WO | 2019/103460 A1 | 5/2019 |
| WO | 2019151834 A1 | 8/2019 |
| WO | 2019163483 A1 | 8/2019 |

OTHER PUBLICATIONS

Anonymous: "Transition metal—Wikipedia", Jan. 1, 2000 (Jan. 1, 2000), XP093032392, Retrieved from the Internet: URL:https://en.wikipedia.org/wiki/Transition_metal [retrieved on Mar. 16, 2023] 8 pgs.

Abbiredd et al: "A review of modern particle sizing methods", Proceedings of the Institution of Civil Engineers. Geotechnicalengineering, London, GB, vol. 162, No. 4, Jan. 2009, pp. 193-201, XP009150583, ISSN: 1353-2618. 10 pgs.

Anonymous: "Strength of materials—Wikipedia", Jan. 1, 2023 (Jan. 1, 2023), XP093025403, Retrieved from the Internet: URL:https://en.wikipedia.org/wiki/Strength_of_materials [retrieved on Feb. 20, 2023] .8 pgs.

Extended European Search Report for Application No. 21771732.1 dated May 30, 2023. 10 pgs.

Search Report dated Jun. 20, 2023 from Office Action for Chinese Application No. 202180012561.1 issued Jun. 25, 2023. 3 pgs. (see p. 2, categorizing the cited references.

\* cited by examiner

POSITIVE ELECTRODE MATERIAL FOR LITHIUM SECONDARY BATTERY, AND POSITIVE ELECTRODE AND LITHIUM SECONDARY BATTERY WHICH INCLUDE THE SAME

CROSS-REFERENCE TO RELATED APPLICATIONS

This application is a national phase entry under 35 U.S.C. § 371 of International Application No. PCT/KR2021/003342, filed on Mar. 18, 2021, which claims priority from Korean Patent Application No. 10-2020-0033435, filed on Mar. 18, 2020, the disclosures of which are incorporated by reference herein.

TECHNICAL FIELD

The present invention relates to a positive electrode material for a lithium secondary battery and a method of preparing the positive electrode material.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

Lithium transition metal composite oxides have been used as a positive electrode active material of the lithium secondary battery, and, among these oxides, a lithium cobalt composite metal oxide, such as $LiCoO_2$, having a high operating voltage and excellent capacity characteristics has been mainly used. However, the $LiCoO_2$ has poor thermal properties due to an unstable crystal structure caused by delithiation. Also, since the $LiCoO_2$ is expensive, there is a limitation in using a large amount of the $LiCoO_2$ as a power source for applications such as electric vehicles.

Lithium manganese composite metal oxides ($LiMnO_2$ or $LiMn_2O_4$), lithium iron phosphate compounds ($LiFePO_4$, etc.), or lithium nickel composite metal oxides ($LiNiO_2$, etc.) have been developed as materials for replacing the $LiCoO_2$. Among these materials, research and development of the lithium nickel composite metal oxides, in which a large capacity battery may be easily achieved due to a high reversible capacity of about 200 mAh/g, have been more actively conducted. However, the $LiNiO_2$ has limitations in that the $LiNiO_2$ has poorer thermal stability than the $LiCoO_2$ and, when an internal short circuit occurs in a charged state due to an external pressure, the positive electrode active material itself is decomposed to cause rupture and ignition of the battery. Accordingly, as a method to improve low thermal stability while maintaining the excellent reversible capacity of the $LiNiO_2$, a lithium transition metal oxide, in which a portion of nickel (Ni) is substituted with cobalt (Co), manganese (Mn), or aluminum (Al), has been developed.

With respect to a lithium ion battery using the lithium transition metal oxide, particularly, a lithium transition metal oxide containing a high content of nickel (Ni-rich) as a positive electrode active material, battery capacity, high output, and gas generation at high temperatures are not only affected by chemical properties such as a composition of the positive electrode active material, a content of impurities, and a content of lithium by-product present on a surface thereof, but are also affected by physical properties such as size, surface area, density, and shape of positive electrode active material particles.

In general, in order to maximize volumetric energy density of a battery, a method has been used in which the volumetric energy density of the battery is improved by using a mixture of a positive electrode active material having a large particle diameter and a positive electrode active material having a small particle diameter to fill voids between large-diameter positive electrode active material particles with the small-diameter positive electrode active material, and a method of rolling a positive electrode active material layer using a roll press has been used to prepare the positive electrode active material layer having a more dense structure. In this case, since excessive cracks occur in the particles having relatively weak particle strength during rolling due to a difference in particle strength between the positive electrode active material having a large particle diameter and the positive electrode active material having a small particle diameter, the particles not only lose their original shape, but a contact area with an electrolyte solution is also excessively increased, and thus, there has been a problem in that life characteristics are degraded when the positive electrode active material layer is used in the battery.

Therefore, there is a need to develop a positive electrode material which may improve volumetric energy density and may improve life characteristics by suppressing particle cracking during rolling of the positive electrode active material.

PRIOR ART DOCUMENT (Patent Document 1) Japanese Patent No. 6601500

DISCLOSURE OF THE INVENTION

Technical Problem

An aspect of the present invention provides a positive electrode material which may suppress particle cracking during rolling in the positive electrode material including two types of positive electrode active materials having different average particle diameters.

Another aspect of the present invention provides a positive electrode including the positive electrode material.

Another aspect of the present invention provides a lithium secondary battery including the positive electrode.

Technical Solution

According to an aspect of the present invention, there is provided a positive electrode material including a first positive electrode active material and a second positive electrode active material which have different average particle diameters, wherein the first positive electrode active material and the second positive electrode active material are each independently a lithium transition metal oxide in which a molar ratio of nickel is 80 mol % or more relative to the total molar amount of transition metals in the lithium transition metal oxide, the average particle diameter of the first positive electrode active material is larger than the average particle diameter of the second positive electrode active material, and the positive electrode material satisfies Equation (1) below.

$$0 < \{(B-A)/B\} \times 100 \leq 10 \qquad \text{Equation (1):}$$

In Equation (1), A denotes a particle strength of the first positive electrode active material, and B denotes a particle strength of the second positive electrode active material.

According to another aspect of the present invention, there is provided a positive electrode for a lithium secondary battery which includes the positive electrode material, and a lithium secondary battery including the positive electrode.

Advantageous Effects

Since a positive electrode material according to the present invention has a small difference in particle strength between a small-diameter positive electrode active material particle and a large-diameter positive electrode active material particle, it may effectively suppress a cracking phenomenon of the positive electrode active material particles during rolling of a positive electrode.

Also, in the present invention, life characteristics may be further improved by using the small-diameter positive electrode active material particles having higher particle strength than the large-diameter positive electrode active material particles.

Thus, in a case in which the positive electrode material of the present invention is used, the occurrence of a side reaction with an electrolyte solution caused by active material particle cracking may be minimized, and excellent life characteristics may be achieved.

MODE FOR CARRYING OUT THE INVENTION

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

Throughout this specification, the expression "average particle diameter ($D_{50}$)" may be defined as a particle diameter at a cumulative volume of 50% in a particle size distribution curve. The average particle diameter ($D_{50}$), for example, may be measured by using a laser diffraction method. The laser diffraction method may generally measure a particle diameter ranging from a few nm to a few mm and may obtain highly repeatable and high-resolution results.

Positive Electrode Material

The present inventors have found that, since two types of positive electrode active materials having different average particle diameters are mixed and used, but a difference in particle strength between a large-diameter first positive electrode active material particle having a relatively large average particle diameter and a small-diameter second positive electrode active material particle having a relatively small average particle diameter is optimized, particle cracking may be suppressed while high volumetric energy density is obtained, and, accordingly, high-temperature life characteristics may be improved when the two types of positive electrode active materials are used in a battery, thereby leading to the completion of the present invention.

Hereinafter, a positive electrode material according to the present invention will be described in detail.

The positive electrode material according to the present invention is a positive electrode material including a first positive electrode active material and a second positive electrode active material which have different average particle diameters, wherein the first positive electrode active material and the second positive electrode active material are each independently a lithium transition metal oxide in which a molar ratio of nickel is 80 mol % or more relative to the total molar amount of transition metals in the lithium transition metal oxide, the average particle diameter of the first positive electrode active material is larger than the average particle diameter of the second positive electrode active material, and particle strengths of the first positive electrode active material and the second positive electrode active material satisfy Equation (1) below.

$$0<\{(B-A)/B\}\times 100\leq 10 \qquad \text{Equation (1):}$$

In Equation (1), A is a particle strength of the first positive electrode active material, and B is a particle strength of the second positive electrode active material.

Specifically, the positive electrode material according to the present invention includes the first positive electrode active material and the second positive electrode active material which have different average particle diameters, and has a bimodal particle size distribution.

In this case, the first positive electrode active material is large-diameter particles having a relatively large average particle diameter, and the second positive electrode active material is small-diameter particles having a relatively small average particle diameter.

More specifically, the first positive electrode active material may have an average particle diameter ($D_{50}$) of greater than 8 μm to 50 μm or less, preferably 8.5 μm to 30 μm, and more preferably 8.5 μm to 25 μm, and the second positive electrode active material may have an average particle diameter ($D_{50}$) of 0.1 μm to 8 μm, preferably 1 μm to 8 μm, and more preferably 2 μm to 8 μm.

In a case in which the average particle diameters ($D_{50}$) of the first positive electrode active material and the second positive electrode active material satisfy the above ranges, since the second positive electrode active material particles are filled between the particles of the first positive electrode active material, tap density of the positive electrode material including the same may be improved. Since the higher the tap density is the higher the packing density of the electrode is, a slurry containing the positive electrode active material having the tap density may be thinly applied to a surface of a positive electrode collector when the electrode is prepared by using the positive electrode material, and thus, a thickness of the electrode after coating is improved to be thin and a pressure required to reach the thickness of the electrode to match rolling density in a process of rolling the electrode may be reduced to improve cracking of the positive electrode active material due to the rolling. In addition, capacity characteristics may be further improved as the volumetric energy density is improved.

The first positive electrode active material and the second positive electrode active material are each independently a nickel-rich lithium transition metal oxide in which a mole ratio of nickel is 80 mol % or more relative to the total molar amount of transition metals in the lithium transition metal oxide.

Since the nickel-rich lithium transition metal oxide has large capacity per unit volume, excellent capacity characteristics may be achieved when it is used in a battery.

Preferably, the first positive electrode active material and the second positive electrode active material may each independently include a lithium transition metal oxide represented by Formula 1 below.

$$Li_{1+a}Ni_xCo_yM^1_zM^2_wO_2 \qquad \text{[Formula 1]}$$

In Formula 1, $M^1$ may be at least one selected from the group consisting of manganese (Mn) and aluminum (Al), and may preferably include Mn and Al at the same time.

$M^2$ may be at least one selected from the group consisting of tungsten (W), molybdenum (Mo), chromium (Cr), zirconium (Zr), titanium (Ti), magnesium (Mg), tantalum (Ta), and niobium (Nb).

1+a represents a molar ratio of lithium in the lithium transition metal oxide, wherein a may satisfy $0 \leq a \leq 0.3$, for example, $0 \leq a \leq 0.2$.

x represents a molar ratio of nickel in total transition metals, wherein x may satisfy $0.8 \leq x < 1.0$, $0.80 \leq x \leq 0.99$, $0.80 \leq x \leq 0.95$, $0.85 \leq x < 1$, or $0.80 \leq x \leq 0.85$. In a case in which the nickel content satisfies the above range, excellent capacity characteristics may be achieved.

y represents a molar ratio of cobalt in the total transition metals, wherein y may satisfy $0 < y < 0.20$, $0 < y < 0.15$, or $0.01 \leq y \leq 0.10$.

z represents a molar ratio of $M^1$ in the total transition metals, wherein z may satisfy $0 \leq z \leq 0.2$, $0 \leq z \leq 0.15$, or $0.01 < z < 0.10$.

w represents a molar ratio of $M^2$ in the total transition metals, wherein w may satisfy $0 \leq w \leq 0.1$ or $0 \leq w \leq 0.05$.

Specifically, the first positive electrode active material and the second positive electrode active material may each independently include a lithium transition metal oxide represented by Formula 2 below.

$$Li_{1+a}Ni_xCo_yMn_{z1}Al_{z2}M^2_wO_2 \qquad \text{[Formula 2]}$$

In Formula 2, a, x, y, w, and $M^2$ are the same as defined in Formula 1.

That is, $M^2$ may be at least one selected from the group consisting of W, Mo, Cr, Zr, Ti, Mg, Ta, and Nb.

1+a represents a molar ratio of lithium in the lithium transition metal oxide, wherein a may satisfy $0 \leq a \leq 0.3$, for example, $0 \leq a \leq 0.3$.

x represents a molar ratio of nickel in total transition metals, wherein x may satisfy $0.8 \leq x \leq 1.0$, $0.80 \leq x \leq 0.99$, $0.80 \leq x \leq 0.95$, $0.85 \leq x < 1$, or $0.80 \leq x \leq 0.85$.

y represents a molar ratio of cobalt in the total transition metals, wherein y may satisfy $0 < y < 0.20$, $0 < y < 0.15$, or $0.01 \leq y \leq 0.10$.

w represents a molar ratio of $M^2$ in the total transition metals, wherein w may satisfy $0 \leq w \leq 0.1$ or $0 \leq w \leq 0.05$.

z1 represents a molar ratio of Mn in the transition metals, wherein z1 may satisfy $0 < z1 < 0.2$, $0 < z1 \leq 0.15$, or $0.01 < z1 \leq 0.10$.

z2 represents a molar ratio of Al in the transition metals, wherein z2 may satisfy $0 < z2 < 0.2$, $0 < z2 \leq 0.15$, or $0.01 < z2 \leq 0.10$.

Compositions of the first positive electrode active material and the second positive electrode active material may be the same or different from each other. For example, the first positive electrode active material includes a lithium transition metal oxide having a molar ratio of nickel of 85 mol % or more relative to the total molar amount of transition metals in the lithium transition metal oxide, and the second positive electrode active material includes a lithium transition metal oxide having a molar ratio of nickel of 80 mol % to 85 mol % relative to the total molar amount of transition metals in the lithium transition metal oxide.

The first positive electrode active material and the second positive electrode active material may further include a coating layer including at least one element (hereinafter, referred to as a 'coating element') selected from the group consisting of Al, Ti, W, boron (B), fluorine (F), phosphorus (P), Mg, nickel (Ni), cobalt (Co), iron (Fe), Cr, vanadium (V), copper (Cu), calcium (Ca), zinc (Zn), Zr, Nb, Mo, strontium (Sr), antimony (Sb), bismuth (Bi), silicon (Si), and sulfur (S) on a surface of the lithium transition metal oxide, if necessary. In a case in which the coating layer as described above is included, since a contact between the lithium transition metal oxide and an electrolyte solution is blocked, gas generation due to a side reaction with the electrolyte solution and dissolution of the transition metal may be effectively suppressed.

The coating layer may be formed through a method of mixing the lithium transition metal oxide and a raw material including the coating element and then heat-treating the mixture at a temperature of 200° C. to 500° C.

The positive electrode material according to the present invention satisfies the following Equation (1) when A is the particle strength of the large-particle first positive electrode active material and B is the particle strength of the small-particle second positive electrode active material.

$$0 < \{(B-A)/B\} \times 100 \leq 10 \qquad \text{Equation (1):}$$

In a case in which the positive electrode material satisfies Equation (1), since the particle strengths of the first positive electrode active material having a large particle diameter and the second positive electrode active material having a small particle diameter are similarly controlled, a physical force is dispersed so as not to be concentrated on any one side during rolling of a positive electrode, and thus, the first positive electrode active material and the second positive electrode active material each may maintain an original shape and cracking of the particles may be suppressed.

Specifically, in a case in which the particle strength of the first positive electrode active material and the particle strength of the second positive electrode active material are greater than the range of Equation (1), since particle cracking may occur as the physical force is concentrated on the particles having relatively low particle strength during rolling and a contact area between the positive electrode active material and the electrolyte solution is increased due to the cracking of the particles, and thus, the life characteristics may be degraded when the positive electrode material is used in the battery.

Also, in a case in which the particle strength of the first positive electrode active material and the particle strength of the second positive electrode active material are less than the range of Equation (1), that is, the particle strength B of the small-particle second positive electrode active material is lower than the particle strength A of the large-particle first positive electrode active material, cracking of the small particles having a relatively lower particle strength than the large particles mainly occurs. With respect to the small particles, since they are relatively vulnerable to the contact with the electrolyte solution due to a large specific surface area, battery life performance is more significantly degraded when the cracking of the small particles occurs than when the cracking of the large particles occurs.

Specifically, the particle strength A of the first positive electrode active material may be in a range of 50 MPa to 500 MPa, for example, 100 MPa to 200 MPa, and the particle strength B of the second positive electrode active material may be in a range of 50 MPa to 500 MPa, for example, 100 MPa to 200 MPa. In a case in which the particle strengths of the first positive electrode active material and the second positive electrode active material satisfy the above range, excellent rolling density may be achieved without causing particle cracking during the rolling of the positive electrode.

Since the particle strength of the positive electrode active material varies depending on a composition and characteristics of a positive electrode active material precursor, as a raw material, and sintering conditions, a positive electrode active material having desired particle strength may be prepared by appropriately adjusting the sintering conditions (temperature and time) according to the composition and/or characteristics (surface area, density, shape, etc.) of the positive electrode active material precursor.

The positive electrode material according to the present invention may be prepared by mixing the first positive electrode active material and the second positive electrode active material in which the particle strengths satisfy the condition of Equation (1). In this case, it is desirable that the first positive electrode active material and the second positive electrode active material are mixed in a weight ratio of 50:50 to 99:1, for example, a weight ratio of 70:30 to 90:10. In a case in which the mixing ratio of the first positive electrode active material and the second positive electrode active material satisfies the above range, an effect of improving the tap density of the positive electrode material may be obtained.

According to the present invention, the tap density of the positive electrode material including the first positive electrode active material and the second positive electrode active material may be in a range of 1.00 g/cc to 5.00 g/cc, preferably 1.50 g/cc to 3.50 g/cc, and most preferably 2.00 g/cc to 3.00 g/cc. In a case in which the tap density of the positive electrode material satisfies the above range, a positive electrode having excellent energy density may be prepared.

Positive Electrode

Also, the present invention provides a positive electrode for a lithium secondary battery which includes the positive electrode material prepared by the above-described method.

Specifically, the positive electrode includes a positive electrode collector and a positive electrode active material layer which is disposed on at least one surface of the positive electrode collector and includes the above-described positive electrode active material.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 µm to 500 µm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

The positive electrode active material layer may include a conductive agent and a binder in addition to the above-described positive electrode material according to the present invention.

The positive electrode material may be included in an amount of 80 wt % to 99 wt %, for example, 85 wt % to 98 wt % based on a total weight of the positive electrode active material layer. When the positive electrode material is included in an amount within the above range, excellent capacity characteristics may be obtained.

The conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 1 wt % to 30 wt % based on the total weight of the positive electrode active material layer.

The binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 1 wt % to 30 wt % based on the total weight of the positive electrode active material layer.

The positive electrode may be prepared according to a typical method of preparing a positive electrode except that the positive electrode material according to the present invention is used. Specifically, a positive electrode material mixture, which is prepared by dissolving or dispersing the above-described positive electrode material as well as selectively the binder and the conductive agent in a solvent, is coated on the positive electrode collector, and the positive electrode may then be prepared by drying and rolling the coated positive electrode collector, or the positive electrode may be prepared by casting the positive electrode material mixture on a separate support and then laminating a film separated from the support on the positive electrode collector.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode material, the conductive agent, and the binder in consideration of a coating thickness of a slurry and manufacturing yield, and may allow to have a viscosity that may provide excellent thickness uniformity during the subsequent coating for the preparation of the positive electrode.

Lithium Secondary Battery

Furthermore, in the present invention, an electrochemical device including the positive electrode may be prepared. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein, since the positive electrode is the same as described above, detailed descriptions thereof will be omitted, and the remaining configurations will be only described in detail below.

Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta(0<\beta<2)$, $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

The negative electrode active material may be included in an amount of 80 wt % to 99 wt % based on a total weight of the negative electrode active material layer.

The binder is a component that assists in the binding between the conductive agent, the active material, and the current collector, wherein the binder is typically added in an amount of 0.1 wt % to 10 wt % based on the total weight of the negative electrode active material layer. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated-EPDM, a styrene-butadiene rubber, a fluoro rubber, and various copolymers thereof.

The conductive agent is a component for further improving conductivity of the negative electrode active material, wherein the conductive agent may be added in an amount of 10 wt % or less, for example, 5 wt % or less based on the total weight of the negative electrode active material layer. The conductive agent is not particularly limited as long as it has conductivity without causing adverse chemical changes in the battery, and, for example, a conductive material such as: graphite such as natural graphite or artificial graphite; carbon black such as acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

The negative electrode, for example, may be prepared by coating a negative electrode material mixture, which is prepared by dissolving or dispersing selectively the binder and the conductive agent as well as the negative electrode active material in a solvent, on the negative electrode collector and drying the coated negative electrode collector, or may be prepared by casting the negative electrode material mixture on a separate support and then laminating a film separated from the support on the negative electrode collector.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve life characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 part by weight to 5 parts by weight based on 100 parts by weight of a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

Example 1

A first positive electrode active material and a second positive electrode active material, which were respectively prepared by methods below, were mixed in a weight ratio of 8:2, and the mixture was used as a positive electrode material.

(1) First Positive Electrode Active Material $NiSO_4$, $CoSO_4$, and $MnSO_4$ were dissolved in water in amounts such that a molar ratio of nickel:cobalt:manganese was 88:5:7 to prepare a transition metal-containing solution with a concentration of 2 M.

A container containing the transition metal-containing solution, an additional 25 wt % NaOH solution, and a 15 wt % $NH_4OH$ aqueous solution were respectively connected to a 200 L batch-type reactor set at 55° C.

Subsequently, after deionized water was put into the batch-type reactor, dissolved oxygen in the water was removed by purging with nitrogen gas to create a non-oxidizing atmosphere in the reactor. Thereafter, after NaOH was added, a pH in the co-precipitation reactor was maintained at 11.7 while the mixture was stirred at a stirring speed of 250 rpm.

Thereafter, the transition metal-containing solution was added to the co-precipitation reactor at a rate of 250 mL/hr, an $NH_4OH$ aqueous solution was added at a rate of 40 mL/hr, and an aqueous NaOH solution was added at a rate at which a pH of a reaction solution may be maintained at 11.7, and, after 6 hours of reaction, stirring was stopped and a supernatant was removed to concentrate the reaction solution. This process was repeated 4 to 5 times to grow particles until an average particle diameter ($D_{50}$) reached about 15 μm.

The first transition metal oxide precursor particles thus prepared were filtered with a filter press, and then dried at 130° C. for 24 hours to obtain a first positive electrode active material precursor with a composition of $Ni_{0.88}Co_{0.05}Mn_{0.07}(OH)_2$.

Subsequently, $LiOH \cdot H_2O$ was added such that an equivalence ratio of $LiOH \cdot H_2O$ to the first positive electrode active material precursor was 1.06, and $Al(OH)_3$ was mixed and sintered at 775° C. for 13.5 hours in an oxygen atmosphere to prepare a lithium transition metal oxide having a molar ratio of nickel:cobalt:manganese:aluminum of 86:5:7:2.

The lithium transition metal oxide was stirred with distilled water in a weight ratio of 1:1.1 and washed with the distilled water.

$H_3BO_3$ was mixed with the lithium transition metal oxide after the completion of the washing and a heat treatment was performed at 295° C. for 5 hours to prepare a B-coated first positive electrode active material.

(2) Second Positive Electrode Active Material

A second positive electrode active material precursor was prepared in the same manner as the method of preparing the first positive electrode active material precursor except that $NiSO_4$, $CoSO_4$, and $MnSO_4$ were dissolved in water in amounts such that a molar ratio of nickel:cobalt:manganese was 83:5:12 to prepare a transition metal-containing solution with a concentration of 2 M, the transition metal-containing solution was used, and a concentration process was repeated only 2 to 3 times during the preparation of the precursor to grow particles until an average particle diameter ($D_{50}$) was about 5 μm.

The average particle diameter ($D_{50}$) of the second positive electrode active material precursor prepared was about 5 μm, and a composition was $Ni_{0.83}Co_{0.05}Mn_{0.12}(OH)_2$.

Then, $LiOH \cdot H_2O$ was added such that an equivalence ratio of $LiOH \cdot H_2O$ to the second positive electrode active material precursor was 1.06, and $Al(OH)_3$ was mixed and sintered at 790° C. for 13.5 hours in an oxygen atmosphere to prepare a lithium transition metal oxide having a molar ratio of nickel:cobalt:manganese:aluminum of 81:5:12:2.

The lithium transition metal oxide was stirred with distilled water in a weight ratio of 1:1.1 and washed with the distilled water.

$H_3BO_3$ was mixed with the lithium transition metal oxide after the completion of the washing and a heat treatment was performed at 295° C. for 5 hours to prepare a B-coated second positive electrode active material.

Example 2

A positive electrode material was prepared in the same manner as in Example 1 except that the sintering temperature during the preparation of the first positive electrode active material was 760° C., and the sintering temperature during the preparation of the second positive electrode active material was 765° C.

Comparative Example 1

A positive electrode material was prepared in the same manner as in Example 1 except that the sintering temperature during the preparation of the first positive electrode active material was 760° C., and the sintering temperature during the preparation of the second positive electrode active material was 770° C.

Comparative Example 2

A positive electrode material was prepared in the same manner as in Example 1 except that $Ni_{0.88}Co_{0.5}Mn_{0.07}(OH)_2$ having an average particle diameter ($D_{50}$) of about 15 μm, which was commercially available from Zoomwe, was used as the first positive electrode active material precursor.

Comparative Example 3

A positive electrode material was prepared in the same manner as in Example 1 except that $Ni_{0.88}Co_{0.05}Mn_{0.07}(OH)_2$ having an average particle diameter ($D_{50}$) of about 15 μm, which was commercially available from Zoomwe, was used as the first positive electrode active material precursor and the sintering temperature during the preparation of the second positive electrode active material was 765° C.

Experimental Example 1

(1) Average Particle Diameter ($D_{50}$)

An average particle diameter ($D_{50}$) of each of the positive electrode active materials prepared in Examples 1 and 2 and Comparative Examples 1 to 3 was measured.

Specifically, S-3500 by Microtrac was used in order to measure the average particle diameters of the positive electrode active material particles of Examples 1 and 2 and Comparative Examples 1 to 3, and the results thereof are presented in Table 1 below.

(2) Particle Strength

Samples of the positive electrode active material particles prepared in Examples 1 and 2 and Comparative Examples 1 to 3 were collected, and the time of occurrence of cracks in the particle was measured while applying a pressure to each collected sample and was converted into a pressure unit (MPa) to measure particle strength. Measurement results are presented in Table 1 below.

TABLE 1

| | First positive electrode active material particles | | Second positive electrode active material particles | | |
| --- | --- | --- | --- | --- | --- |
| | Particle strength (A) (MPa) | Average particle diameter ($D_{50}$) (pm) | Particle strength (B) (MPa) | Average particle diameter ($D_{50}$) (pm) | {(B − A)/B} × 100 |
| Example 1 | 161 | 14.8 | 176 | 5.0 | 8.5 |
| Example 2 | 126 | 14.9 | 139 | 4.9 | 9.4 |
| Comparative Example 1 | 126 | 14.8 | 142 | 5.0 | 11.3 |
| Comparative Example 2 | 142 | 14.9 | 176 | 5.0 | 19.3 |
| Comparative Example 3 | 142 | 14.6 | 139 | 4.9 | −2.2 |

Experimental Example 2

Each of the positive electrode materials prepared in Example 1 and Comparative Example 1, a conductive agent (FX35), and a binder (KF9700 and BM730H were mixed in a weight ratio of 1.35:0.15) were mixed in an N-methyl pyrrolidone (NMP) solvent at a weight ratio of 97.5:1:1.5 to prepare a positive electrode slurry. One surface of an aluminum current collector was coated with the positive electrode slurry, dried at 130° C., and then rolled to have a porosity of 24% to prepare a positive electrode.

Figure 1:
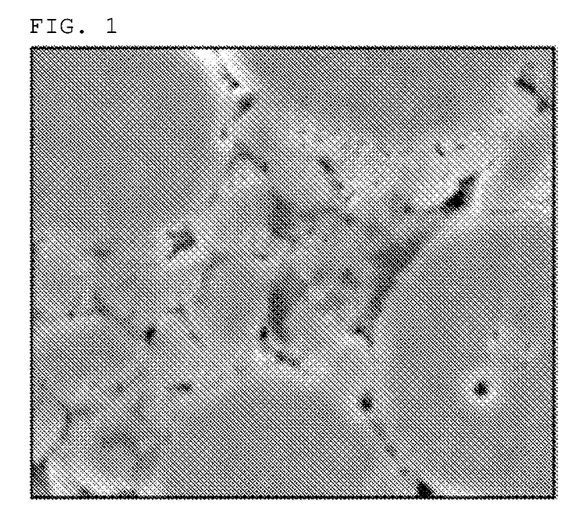
FIG. 1 is a scanning electron microscope (SEM) image illustrating a cross section of a positive electrode which is prepared by using a positive electrode material prepared in Example 1.
Figure 2:
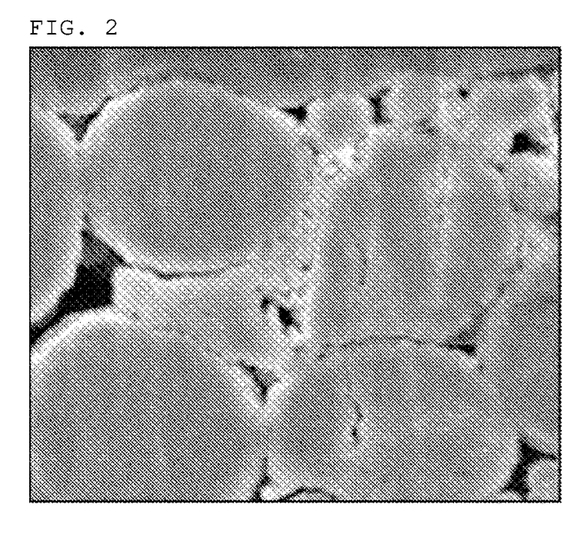
FIG. 2 is an SEM image illustrating a cross section of a positive electrode which is prepared by using a positive electrode material prepared in Comparative Example 1.

Cross-sections of the positive electrodes prepared by using the positive electrode materials of Example 1 and Comparative Example 1, which were observed with a scanning electron microscope, are illustrated in FIG. 1 and FIG. 2, respectively.

As illustrated in FIG. 1, in a case in which the positive electrode material prepared in Example 1 was used, it may be confirmed that a cracking phenomenon of the positive electrode active material particles hardly occurred. In contrast, as illustrated in FIG. 2, in a case in which the positive electrode material prepared in Comparative Example 1 was used, it may be confirmed that a cracking phenomenon of the first positive electrode active material particles having a large particle diameter was prominent and the second positive electrode active material particles having a small particle diameter also lost their circular shape due to particle cracking.

Experimental Example 3

Each of the positive electrode materials prepared in Examples 1 and 2 and Comparative Examples 1 to 3, a conductive agent (FX35), and a binder (KF9700 and BM730H were mixed in a weight ratio of 1.35:0.15) were mixed in an N-methyl-2-pyrrolidone (NMP) solvent at a weight ratio of 97.5:1:1.5 to prepare a positive electrode slurry. One surface of an aluminum current collector was coated with the positive electrode slurry, dried at 130° C., and then rolled to have a porosity of 24% to prepare a positive electrode.

Each lithium secondary battery was prepared by preparing an electrode assembly by disposing a separator between each of the above-prepared positive electrodes and a negative electrode (lithium (Li) metal disk), disposing the electrode assembly in a battery case, and then injecting an electrolyte solution into the case. In this case, as the electrolyte solution, an electrolyte solution, in which 1 M LiPF$_6$ was dissolved in an organic solvent in which ethylene carbonate:ethyl methyl carbonate:diethyl carbonate were mixed in a volume ratio of 3:3:4, was used.

Subsequently, each of the lithium secondary batteries prepared in Examples 1 and 2 and Comparative Examples 1 to 3 was charged at a constant current of 0.1 C to 4.25 V in a constant current/constant voltage (CC/CV) mode at 25° C. (CV 0.05 C), and then discharged to 3.0 V in a CC mode to measure 1$^{st}$ cycle initial charge capacity and discharge capacity.

Also, a charge and discharge cycle was repeated 30 times at a constant current of 0.33 C in a range of 3.0 V to 4.25 V at 45° C. to measure capacity retention and resistance increase rate in a 30$^{th}$ cycle of each lithium secondary battery. Measurement results are presented in Table 2 below.

TABLE 2

| | Initial charge capacity (mAh/g) | Initial discharge capacity (mAh/g) | Capacity retention (%) | Resistance increase rate (%) |
|---|---|---|---|---|
| Example 1 | 229.9 | 208.7 | 96.8 | 41.2 |
| Example 2 | 229.7 | 208.0 | 96.4 | 43.5 |
| Comparative Example 1 | 229.8 | 208.2 | 94.5 | 53.7 |
| Comparative Example 2 | 228.4 | 204.4 | 94.1 | 57.5 |
| Comparative Example 3 | 228.1 | 204.6 | 94.6 | 52.8 |

As illustrated in Table 2, with respect to the lithium secondary batteries using the positive electrode materials of Examples 1 and 2 satisfying Equation (1), it may be confirmed that capacity retentions and resistance increase rates after 30 cycles were better than those of the lithium secondary batteries using the positive electrode materials of Comparative Examples 1 to 3 which did not satisfy Equation (1).

The invention claimed is:
1. A positive electrode material, comprising:
a first positive electrode active material; and
a second positive electrode active material,
wherein the first positive electrode active material and the second positive electrode active material are each independently a lithium transition metal oxide having a molar ratio of nickel of 80 mol % or more relative to the total molar amount of transition metals in the lithium transition metal oxide,
wherein an average particle diameter ($D_{50}$) of the first positive electrode active material is larger than an average particle diameter ($D_{50}$) of the second positive electrode active material, and
wherein the positive electrode material satisfies Equation (1):

$$0<\{(B-A)/B\}\times 100 \leq 10 \qquad \text{Equation (1):}$$

wherein, in Equation (1), A is a particle compressive fracture strength of the first positive electrode active material, and B is a particle compressive fracture strength of the second positive electrode active material wherein the first positive electrode active material and the second positive electrode active material are each independently a lithium transition metal oxide represented by Formula 1: $Li_{1+a}Ni_xCo_yM^1_zM^2_wO_2$ [Formula 1] wherein, in Formula 1, $0 \leq a \leq 0.3$, $0.8 \leq x < 1.0$, $0 < y < 0.2$, $0 < z < 0.2$, and $0 \leq w \leq 0.1$, $M^1$ is at least one selected from the group consisting of manganese (Mn) and aluminum (Al), and $M^2$ is at least one selected from the group consisting of tungsten (W), molybdenum (Mo), chromium (Cr), zirconium (Zr), titanium (Ti), magnesium (Mg), tantalum (Ta), and niobium (Nb).

2. The positive electrode material of claim 1, wherein the first positive electrode active material and the second positive electrode active material are each independently a lithium transition metal oxide represented by Formula 2:

$Li_{1+a}Ni_xCo_yMn_{z1}Al_{z2}M^2_wO_2$ [Formula 2]

wherein, in Formula 2,
$0 \leq a \leq 0.3$, $0.8 \leq x < 1.0$, $0 < y < 0.2$, $0 < z1 < 0.2$, $0 < z2 < 0.2$, and $0 \leq w \leq 0.1$, and
$M^2$ is at least one selected from the group consisting of W, Mo, Cr, Zr, Ti, Mg, Ta, and Nb.

3. The positive electrode material of claim 1, wherein the first positive electrode active material is a lithium transition metal oxide having a molar ratio of the nickel of 85 mol % or more relative to the total molar amount of transition metals in the lithium transition metal oxide, and
Wherein the second positive electrode active material is a lithium transition metal oxide having a molar ratio of the nickel of 80 mol % to 85 mol % relative to the total molar amount of transition metals in the lithium transition metal oxide.

4. The positive electrode material of claim 1, wherein A is in a range of 50 MPa to 500 MPa.

5. The positive electrode material of claim 1, wherein B is in a range of 50 MPa to 500 MPa.

6. The positive electrode material of claim 1, wherein the positive electrode material has a bimodal particle size distribution.

7. The positive electrode material of claim 1, wherein the average particle diameter ($D_{50}$) of the first positive electrode active material is in a range of greater than 8 μm to 50 μm or less.

8. The positive electrode material of claim 1, wherein the average particle diameter ($D_{50}$) of the second positive electrode active material is in a range of 0.1 μm to 8 μm.

9. The positive electrode material of claim 1, wherein the first positive electrode active material and the second positive electrode active material are present in a weight ratio of 50:50 to 99:1.

10. A positive electrode comprising the positive electrode material of claim 1.

11. A lithium secondary battery comprising the positive electrode of claim 10.

* * * * *